(12) United States Patent
Li

(10) Patent No.: US 9,928,499 B2
(45) Date of Patent: *Mar. 27, 2018

(54) METHOD AND SYSTEM FOR PAYMENT THROUGH MOBILE DEVICES

(71) Applicant: Alibaba Group Holding Limited, George Town (KY)

(72) Inventor: Gang Li, Beijing (CN)

(73) Assignee: Alibaba Group Holding Limited (KY)

(*) Notice: Subject to any disclaimer, the term of this patent is extended or adjusted under 35 U.S.C. 154(b) by 859 days.

This patent is subject to a terminal disclaimer.

(21) Appl. No.: 14/336,718

(22) Filed: Jul. 21, 2014

(65) Prior Publication Data

US 2014/0379565 A1 Dec. 25, 2014

Related U.S. Application Data

(63) Continuation of application No. 13/926,814, filed on Jun. 25, 2013, now Pat. No. 8,818,894, which is a (Continued)

(30) Foreign Application Priority Data

Jun. 9, 2009 (CN) .......................... 2009 1 0145486

(51) Int. Cl.
*G06Q 20/32* (2012.01)
*H04L 12/14* (2006.01)
(Continued)

(52) U.S. Cl.
CPC .......... *G06Q 20/322* (2013.01); *G06Q 20/32* (2013.01); *H04L 12/1403* (2013.01);
(Continued)

(58) Field of Classification Search
CPC .. G06Q 20/322; G06Q 20/32; H04L 12/1403; H04L 12/1453; H04M 15/68; H04W 4/24
(Continued)

(56) References Cited

U.S. PATENT DOCUMENTS 6,944,650 B1 9/2005 Urien
7,047,558 B1 5/2006 Mariana
(Continued)

FOREIGN PATENT DOCUMENTS

CN 101155043 A 4/2008
JP 2000181963 6/2000

OTHER PUBLICATIONS ("What is Loopback?—Definition from Techopedia", retrieved from https://www.techopedia.com/definition/14138/loopback on Jun. 5, 2017, 3 pages).*

(Continued)

*Primary Examiner* — James D Nigh
(74) *Attorney, Agent, or Firm* — Van Pelt, Yi & James LLP

(57) ABSTRACT

Processing payment through a mobile device includes: receiving a command; generating a payment request based on the command and send the payment request to be processed by a lower layer payment program; and monitoring the payment request sent from the localhost address of the mobile device via the predetermined port; in response to the payment request, providing an input interface for payment information in and receive the input payment information; using the lower layer payment program to connect with a payment server and pass the payment information over a network to the payment server; using the lower layer payment program to transfer a payment processing result received from the payment server, to the upper layer application program; and after the upper layer application program has been unblocked, presenting to a user an indication of whether the payment has been successfully processed.

18 Claims, 5 Drawing Sheets

Related U.S. Application Data continuation of application No. 12/802,280, filed on Jun. 2, 2010, now Pat. No. 8,503,993.

(51) Int. Cl.
  *H04W 4/24* (2018.01)
  *H04M 15/00* (2006.01)
(52) U.S. Cl.
  CPC ........ *H04L 12/1453* (2013.01); *H04M 15/68* (2013.01); *H04W 4/24* (2013.01)
(58) Field of Classification Search
  USPC .......................................................... 705/65
  See application file for complete search history.

(56) References Cited

U.S. PATENT DOCUMENTS

| | | | |
|---|---|---|---|
| 7,069,001 B2 | 6/2006 | Rupp et al. | |
| 7,568,015 B2 | 7/2009 | Wang et al. | |
| 7,826,421 B2 | 11/2010 | Pousti et al. | |
| 8,079,030 B1* | 12/2011 | Satish | H04L 63/20 713/164 |
| 8,489,067 B2 | 7/2013 | Rackley, III et al. | |
| 8,503,993 B2 | 8/2013 | Li | |
| 8,662,401 B2* | 3/2014 | Skowronek | G06Q 20/10 235/380 |
| 2002/0069165 A1 | 6/2002 | O'Neil | |
| 2002/0107755 A1 | 8/2002 | Steed et al. | |
| 2002/0147049 A1 | 10/2002 | Carter, Sr. | |
| 2002/0152179 A1 | 10/2002 | Racov | |
| 2003/0014361 A1 | 1/2003 | Klatt et al. | |
| 2003/0014441 A1 | 1/2003 | Suzuki et al. | |
| 2003/0172090 A1* | 9/2003 | Asunmaa | G06F 21/31 |
| 2004/0029569 A1 | 2/2004 | Khan et al. | |
| 2004/0199430 A1 | 10/2004 | Hsieh | |
| 2004/0260608 A1 | 12/2004 | Lewis et al. | |
| 2005/0050208 A1 | 3/2005 | Chatani | |
| 2006/0047704 A1 | 3/2006 | Gopalakrishnan | |
| 2006/0165060 A1 | 7/2006 | Dua | |
| 2006/0218090 A1* | 9/2006 | Luettge | G06Q 20/102 705/40 |
| 2006/0229998 A1 | 10/2006 | Harrison et al. | |
| 2006/0253897 A1* | 11/2006 | Foster | H04N 7/1675 726/3 |
| 2007/0169107 A1 | 7/2007 | Huttunen | |
| 2007/0244811 A1 | 10/2007 | Tumminaro | |
| 2007/0255653 A1 | 11/2007 | Tumminaro et al. | |
| 2008/0011825 A1 | 1/2008 | Giordano et al. | |
| 2008/0147671 A1 | 6/2008 | Simon et al. | |
| 2008/0208681 A1* | 8/2008 | Hammad | G06Q 20/045 705/13 |
| 2008/0275779 A1 | 11/2008 | Lakshminarayanan | |
| 2008/0306782 A1 | 12/2008 | Ephrati | |
| 2009/0037337 A1 | 2/2009 | Baitalmal et al. | |
| 2009/0055749 A1 | 2/2009 | Chatterjee et al. | |
| 2009/0132815 A1 | 5/2009 | Ginter et al. | |
| 2009/0182674 A1 | 7/2009 | Patel et al. | |
| 2009/0281904 A1 | 11/2009 | Pharris | |
| 2009/0292619 A1 | 11/2009 | Kagan et al. | |
| 2009/0313689 A1 | 12/2009 | Nyström et al. | |
| 2010/0003972 A1 | 1/2010 | Little et al. | |
| 2010/0094752 A1 | 4/2010 | Heath | |
| 2010/0130164 A1 | 5/2010 | Chowdhury et al. | |
| 2010/0145861 A1 | 6/2010 | Law et al. | |
| 2010/0153228 A1 | 6/2010 | Ahmavaara | |
| 2010/0185544 A1 | 7/2010 | Adiseshann | |
| 2010/0191604 A1 | 7/2010 | Raleigh | |
| 2010/0205053 A1 | 8/2010 | Shuster | |

OTHER PUBLICATIONS ("What is Localhost?—Definition from Techopedia", retrieved from https://www.techopedia.com/definition/26064/localhost , Jun. 5, 2017, 3 pages.*
("What is localhost? Webopedia Definition", retrieved from http://www.webopedia.com/TERM/L/localhost.html, Jun. 5, 2017, 3 pages.*
("What is loopback? Webopedia Definition", retrieved from http://www.webopedia.com/TERM/L/loopback.html, Jun. 5, 2017, 3 pages.*
Tetsuy Mukai, IPCOM S Series SSL-VPN Functions, PFU—Technical Review, vol. 17 No. 1, PFU Limited, May 1, 2006, pp. 19-25.

* cited by examiner

METHOD AND SYSTEM FOR PAYMENT THROUGH MOBILE DEVICES

CROSS REFERENCE TO OTHER APPLICATIONS

This application is a continuation of co-pending U.S. patent application Ser. No. 13/926,814, entitled METHOD AND SYSTEM FOR PAYMENT THROUGH MOBILE DEVICES filed Jun. 25, 2013 which is incorporated herein by reference for all purposes, which is a continuation of U.S. patent application Ser. No. 12/802,280, now U.S. Pat. No. 8,503,993, entitled METHOD AND SYSTEM FOR PAYMENT THROUGH MOBILE DEVICES filed Jun. 2, 2010 which is incorporated herein by reference in its entirety for all purposes, which claims priority to People's Republic of China Patent Application No. 200910145486.7 entitled PAYMENT METHOD IN MOBILE TERMINAL AND MOBILE DEVICE filed Jun. 9, 2009, which is incorporated herein by reference in its entirety for all purposes.

FILED OF THE INVENTION

The present invention relates to the field of computer software and in particular to a method and system for payment through mobile devices.

BACKGROUND OF THE INVENTION

As mobile devices, such as PDAs, mobile phones and smart phones, become widely used, mobile payment becomes a new and rapidly-adopted alternative payment method. Instead of paying with cash, checks, or credit cards a consumer can use a mobile phone to pay for a wide range of goods and services, such as music, online games, utility bills, books, magazines, etc.

Today, mobile device application programs commonly run on platforms such as Java 2 Micro Edition (J2ME). J2ME is a Java environment designed for mobile devices and embedded systems. Target devices range from industrial controls to mobile phones, digital set-top boxes, and navigation systems.

To implement a mobile payment application, a user program often needs to employ the functionalities provided by the device, such as system code, Application Programming Interface (API) code, etc. For example, a mobile device user may browse a shopping website using an Internet browser program written in HTML or Java script and then decide to pay for the items she selected. This transaction is typically done through an Internet banking client running in the mobile device. For example, mobile phone client Alipay™ is such an Internet banking client. The Alipay™ client is written in the C++ language and directly calls the device APIs. The C++ program code of mobile phone client Alipay™ is compiled to generate an Alipay™ executable file, that is, a file with an ".exe" extension.

In the conventional mobile device application program, script code (HTML code) of the browser application program and other application program code, such as J2ME application code, do not provide a mechanism for direct execution of an executable file because the J2ME platform does not provide interfaces to support such functionality. A browser or script program can neither directly invoke a file with an ".exe" extension nor communicate with another program via an API such as SendMessage. Therefore, a more effective way for the user application program to execute or communicate with the system or API program is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time, or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Payment processing for a mobile device is disclosed. In some embodiments, an upper layer program interacts with a lower layer program on the same device, via a port on the localhost address of the mobile device to process the payment. As used herein, program code that provides a user interface and interacts with the user, such as mobile device client application running in the J2ME platform implemented as script, Java™ code, etc., is referred to as upper layer code or upper layer program. Program code that interacts with the device's hardware platform, such as the device's system code or Application Program Interface (API) code, is referred to as lower layer code or lower layer program. The upper and lower layers interact with each other to process the payment.

Figure 1:
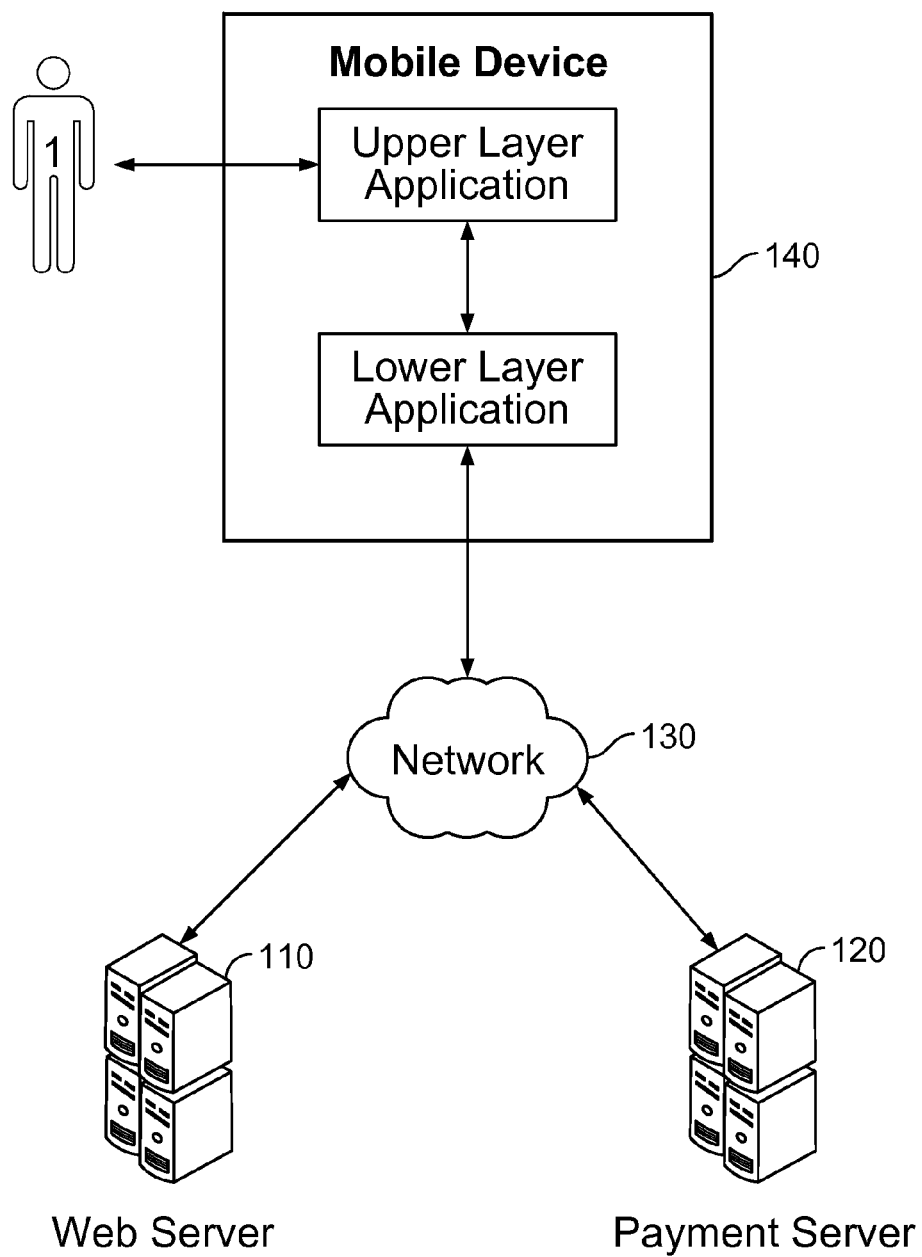
FIG. 1 is a schematic diagram illustrating a network deploying an embodiment of a mobile device payment system.

FIG. 1 is a schematic diagram illustrating a network deploying an embodiment of the mobile device payment system. In the example shown, a mobile device 140 is installed with a web browser to enable a user to browse a webpage on web server 110 through a network 130. If a mobile device user browses a shopping website and follows the purchasing link of the website to conduct a network payment, the web browser on the mobile device then calls a lower layer mobile application program on the same device through a payment process such as process 200 of FIG. 2 to accomplish payment through communicating with a payment server 120.

In this example, the executable file that interacts with the device platform and connects to the network is referred to as the lower layer program. The user/client application, such as a web browser, on the mobile device is referred to as an upper layer payment application program. The upper layer payment application program is sometimes implemented using a series of script code, such as HTML or Java script.

Figure 2:
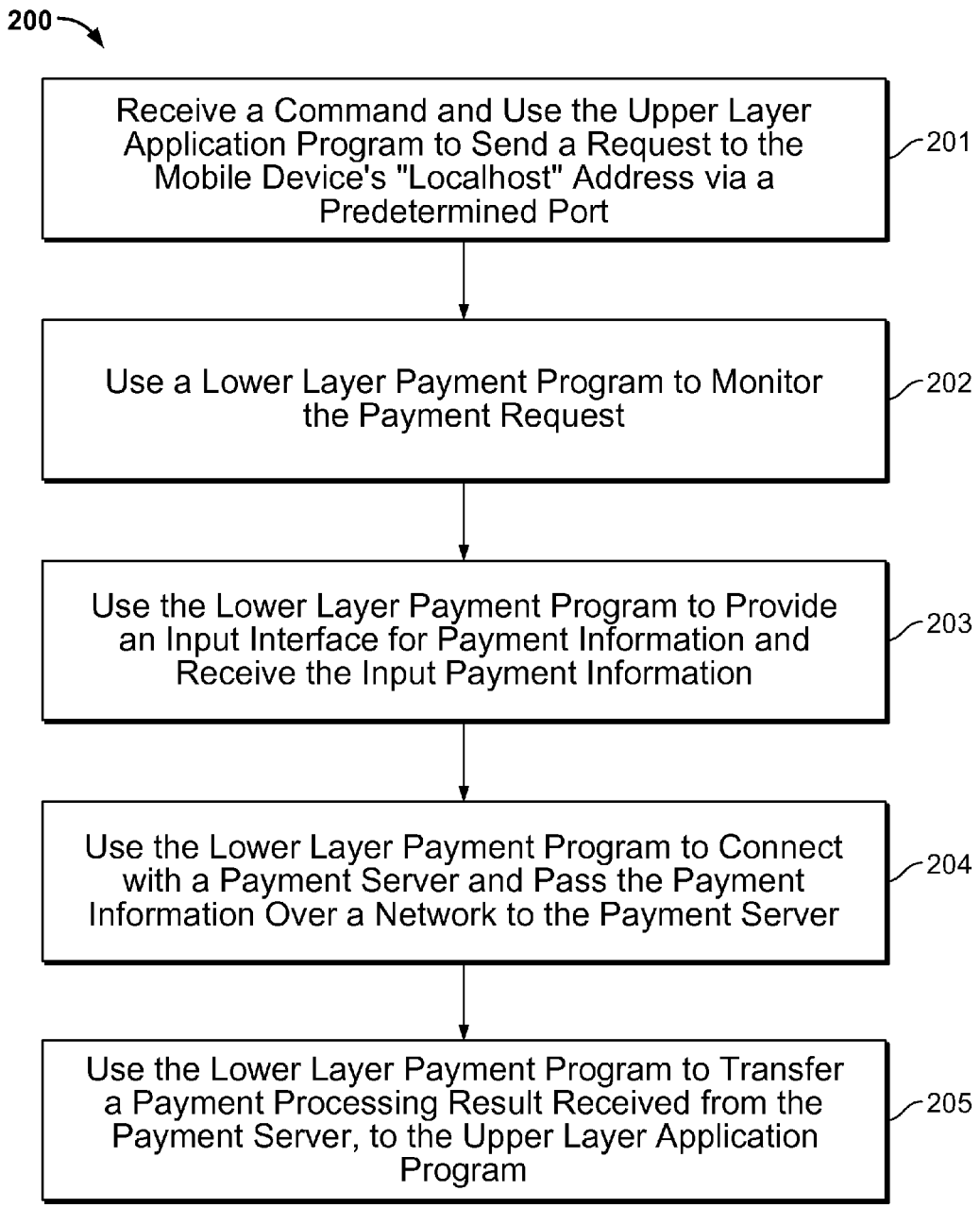
FIG. 2 is a flowchart illustrating an embodiment of a mobile device payment process.

FIG. 2 is a flowchart illustrating an embodiment of a mobile device payment process. An upper layer application program interacts with a lower layer application through a predetermined port of the address "localhost" of the mobile device on which the upper layer application programs resides.

At 201, upon receiving a command for opening a purchase link on a website, an upper layer application program is used to send a request to the mobile device's "localhost" address via a predetermined port.

In some embodiments, the upper layer program sends the request to the network address of "localhost" via the predetermined port. In computer networking, "localhost" is the standard hostname given to the address of the loopback network interface. As defined by Internet Engineering Task Force (IETF) Request for Comments (RFC) 2602, the name is also a reserved domain name set aside to avoid confusion to the narrower definition as a hostname. "Localhost" translates to the loopback IP address 127.0.0.1. Connecting to locally hosted network service, or other inter-process communications, can be performed through the loopback address in a highly efficient manner.

A port in computer networking is an application-specific or process-specific software construct serving as a communication endpoint used by Transport Layer protocols, such as TCP (a connection-oriented protocol) and UDP (a connectionless protocol). A specific port is identified by its number (commonly known as the port number), the IP address it is associated with, and the protocol used for network communication.

The connection-oriented protocol has three main phases: first, establishing a connection prior to transmission of data; second, transmitting the data after establishing the connection; third, releasing the connection after completing transmission of the data. The connection-oriented protocol provides the advantage of data reliability and accuracy of data transmission. The connectionless service is characterized by the existence of only one phase of data transmission. Therefore, all overhead other than data transmission is eliminated. In addition, as long as a transmission entity is active, the reception entity does not have to be active. The connectionless service provides advantages of flexibility, convenience, and promptness and is particularly suitable for transport of a small number of sporadic messages which may not require high accuracy and reliability. The TCP/IP protocol is connectionless on the network layer. However, it is connection-oriented on the transport layer and ports are involved on the transportation layer as well. All the ports below 1024 in the protocol are defined explicitly to correspond to some common services over the Internet. These common services are classified into two categories: those using TCP ports and those using UDP ports.

A communication port that can be named and addressed in the network is an assignable resource of the operating system. In the seven-layer protocol of the Open System Interconnection Reference Model (OSI), the primary difference between the transport layer and the network layer is that the transport layer provides a process communication capability so that a final address of communication over the network includes a host address and also an identifier that can describe the process. Therefore, a port in the TCP/IP protocol can be regarded as an identifier of a communication process over the network.

After an application program (generally referred to as a process after being loaded into a memory) establishes a connection with a port through a system call (also referred to as binding), a corresponding process receives data transported to the port from the transport layer, and data transmitted from the corresponding process to the transport layer is output via the port. In an implementation of the TCP/IP protocol, a port operation is similar to a general I/O operation: acquisition of a port by a process is equivalent to acquisition of a locally unique I/O file. In addition, the port can be accessed using normal reading and writing manners similar to a file descriptor and each port is provided with an integer descriptor referred to as a port number to be distinguished from another port. Since the two protocols of TCP and UDP on the TCP/IP transport layer are two independent software modules, respective port numbers are also mutually independent. For example, there is a port numbered 255 for the TCP and also another port numbered 255 for the UDP. A port number can be assigned in two general manners, one of which is referred to as global assignment, i.e., centralized assignment where a recognized authoritative centralized agency performs and publishes to the public unified assignment according to the user's request, and local assignment, also referred to as a dynamic connection where a process intended to access a service on the transport layer presents an application to the local operating system, the operating system returns a locally unique port number, and the process further connects (binds) itself with the port through appropriate system calling. TCP/IP port numbers are assigned in a combination of the two manners by classifying the port numbers into two categories where a fraction of them are taken as reserved ports to be globally assigned to a service process. Each standard server is provided with a globally recognized port, referred to as a well-known port, with the same port number even on different machines. The remaining ports are taken as free ports to be locally assigned. As specified in the TCP and UDP protocols, only a port below 256 can be taken as a reserved port.

Therefore, in some embodiments, a webpage script is implemented to support sending an HTTP request to the network address of the mobile device using the Hyper Text Transfer Protocol (HTTP). And address 127.0.0.1 or "localhost" can be assigned as the network address of the mobile device as mentioned above. Furthermore, an HTTP request generally adopts the default port number 80. Then, the communication between the upper and lower layer application programs can be enabled through the webpage script, that is, the upper layer application program sends an HTTP request to the "localhost" via a predetermined port over the network so that the lower layer application program of the local host can receive the request.

At 202, the lower layer payment code monitors the request sent from the "localhost" over the loopback network of the mobile device via the predetermined port.

Monitoring the HTTP request via the predetermined port can be achieved through a daemon process. After the lower layer application program is loaded into the memory and is being run, a daemon process associated with the lower layer application program can be initiated. The daemon process can also be initiated as a service of the mobile device upon power-on. Whenever the upper layer application program of the mobile device sends an HTTP request to the "localhost" via the predetermined port, for example, port 80, the daemon process of the lower layer program can detect the HTTP request and further perform a corresponding action.

At 203, the lower layer payment code provides an input interface for payment information in response to the HTTP request of the upper layer application code and receives the input payment information.

In some embodiments, upon receiving an HTTP payment request from the upper layer application code, the lower layer payment code calls directly to the mobile device's API to execute the relevant payment process. Furthermore, in the HTTP request, some parameters, such as passwords, can be passed to the lower layer payment code and the lower layer payment program can call the functions provided by the device API to process the parameters, for example, in response to a parameter passed from an HTTP request, a keypad-password-input operation is executed by calling the lower layer I/O and encryption APIs. Moreover, the HTTP request can further include a demand for processing result feedback.

At 204, the lower layer payment code connects with a payment server and passes the payment information over the network.

In some embodiments, the lower layer application program then interacts with a payment server through the Internet to verify the payment information and return the payment processing result. For example, an Alipay™ server can be used as the payment server.

At 205, the lower layer payment code returns the processing result to the upper layer application code. In some embodiments, the processing result is returned by sending the result information to "localhost" via the predetermined port. The daemon process of the upper layer application code in the memory can detect the result. In some embodiments, after the upper layer application code sends the payment request to the "localhost," the program is blocked and waiting the feedback from the lower layer application program. Then, the upper layer application code performs a plurality of processes based on the result. For example, a webpage script opens a webpage of the shopping website to indicate whether the payment is successful and presents the payment result to the mobile device user.

Figure 3:
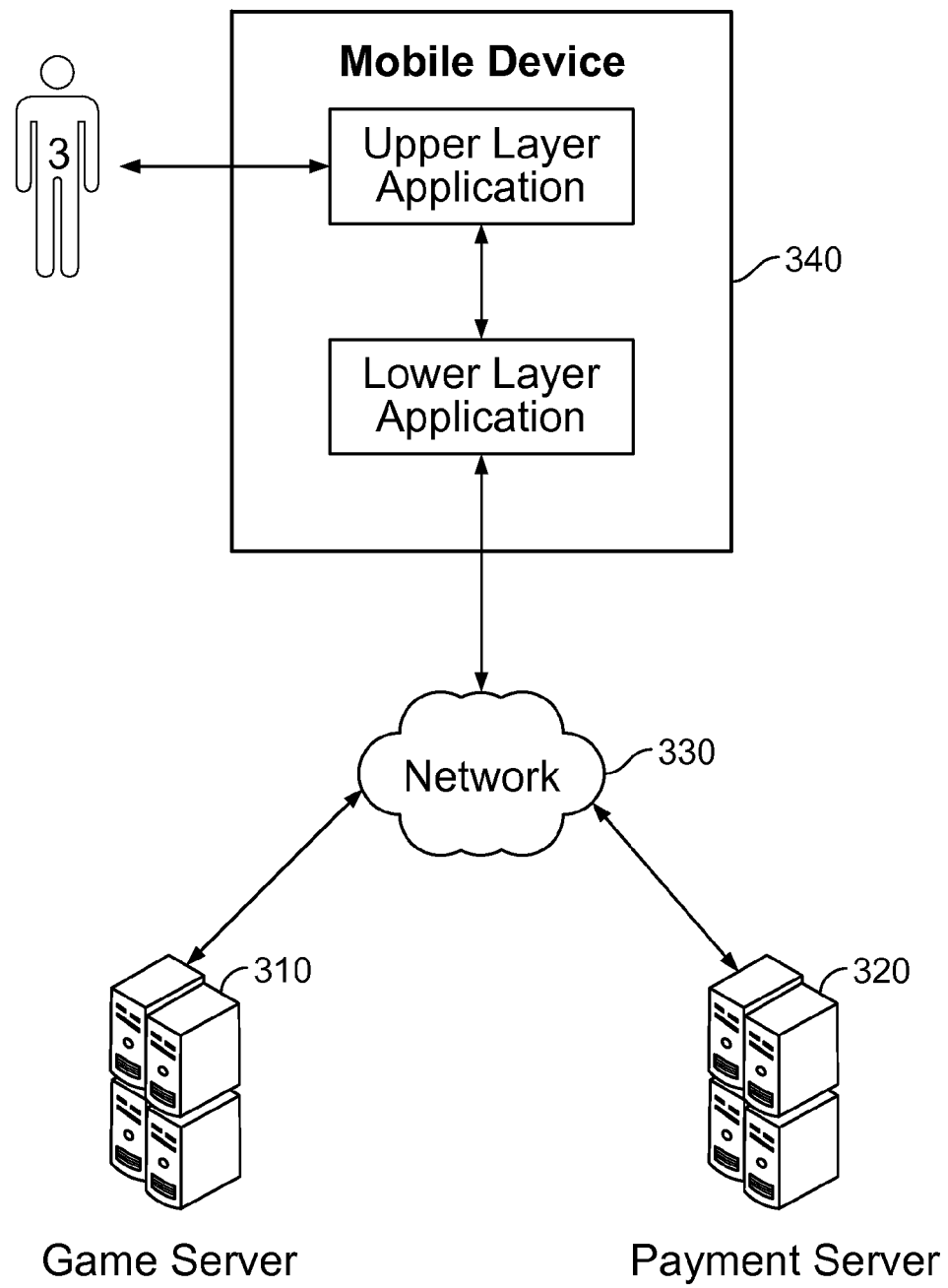
FIG. 3 is another schematic diagram illustrating a network deploying an embodiment of a mobile device payment system.

FIG. 3 is another schematic diagram illustrating a network deploying an embodiment of the mobile device payment system. In the example shown, a mobile device 340 is typically installed with a plurality of game software to enable a user to play paid-games on the game server 310 through a network 330. For example, a J2ME game provides the game content of the first and second stages free to the user. After the user completes playing the first two stages, the J2ME game software then prompts the user to pay for playing the advanced stages of the game. If a mobile device user decides to proceed, the game server 310 will send the mobile device user payment instructions and the user will use the mobile application programs on the same device to accomplish a payment process through communication with a payment server 420. In some embodiments, the lower layer mobile application is in the form of an executable file and will be referred to as the lower layer payment code. The J2ME program on the device that provides the gaming interface and payment interface to the user will be referred to as upper layer application code.

Figure 4:
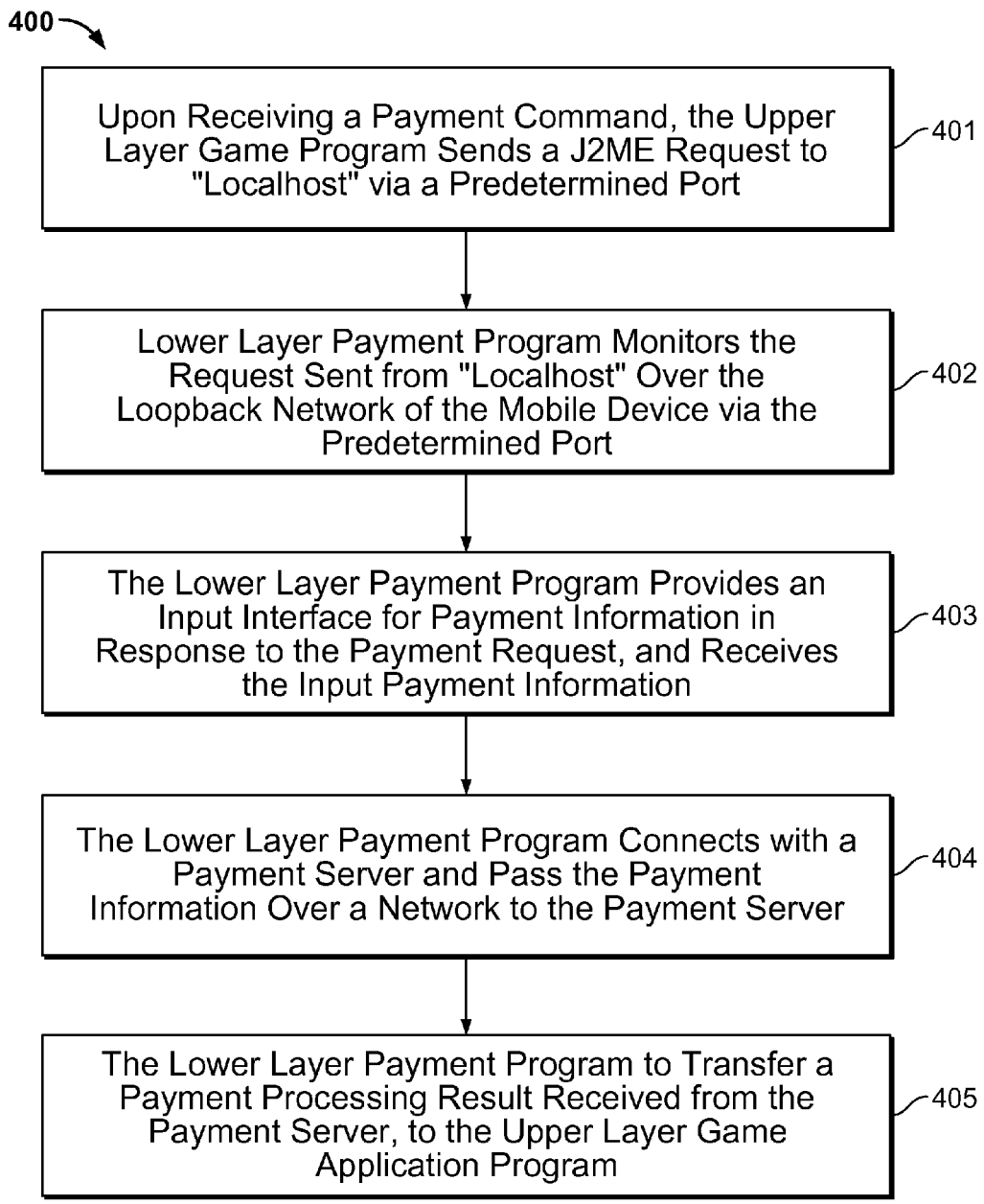
FIG. 4 is another flowchart illustrating an embodiment of a mobile device payment process.

FIG. 4 is a flowchart illustrating an embodiment of a mobile device payment process.

At 401, upon receiving a payment command from a device user, an upper layer game program sends a J2ME request to the "localhost" via a predetermined port. In some embodiments, after interacting with the game server through the J2ME program on the mobile device, the user of the mobile device receives a prompt for payment. A J2ME command with the payment request which includes the network address and a destination port is sent to the "localhost" so that the lower layer payment code of the "localhost" can receive the request. Conventionally, the network address of the "localhost" is 127.0.0.1 and the J2ME command adopts a port number.

Processes 402-404 are similar to processes 202-204 which are illustrated above, except that the payment request in 402-404 is in the J2ME command format and the port number can be any port number which is not reserved by the networking protocol in the mobile device.

At 405, the lower layer payment code returns the processing result to the upper layer application code.

In some embodiments, upon receiving the payment result from the payment server, the lower layer payment code returns the payment processing result to the upper layer J2ME game program. The payment result is sent to the "localhost" via the predetermined port of the J2ME request mentioned in 401. And the daemon process of the upper layer game program in the memory can detect the result. Then, the upper layer application code performs a plurality of processes based on the result. If the payment is successful, the J2ME game program sends a command to the game server indicating successful payment by the user. Furthermore, the game server provides to the J2ME program a command to unlock part of the contents in the J2ME program, for example, the advanced stage of the game program, or the game server provides a download of the advanced stage game contents so that the device user can proceed with the J2ME game. If the payment is not successful, the upper layer game program will present the payment failure status to the device user, who will be prevented from proceeding to the next stage of the game.

Example implementations of embodiments of systems for mobile device payment are described below. The systems are described to include a number of modules or units. The module or units can be implemented as software components executing on one or more processors, or as hardware such as programmable logic devices and/or Application Specific Integrated Circuits designed to perform certain functions or combinations thereof. In some embodiments, the modules/units/subunits can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules or units may be implemented on a single device or distributed across multiple devices. The functions of the modules or units may be merged into one another or further split into multiple sub-modules or sub-units.

Figure 5:
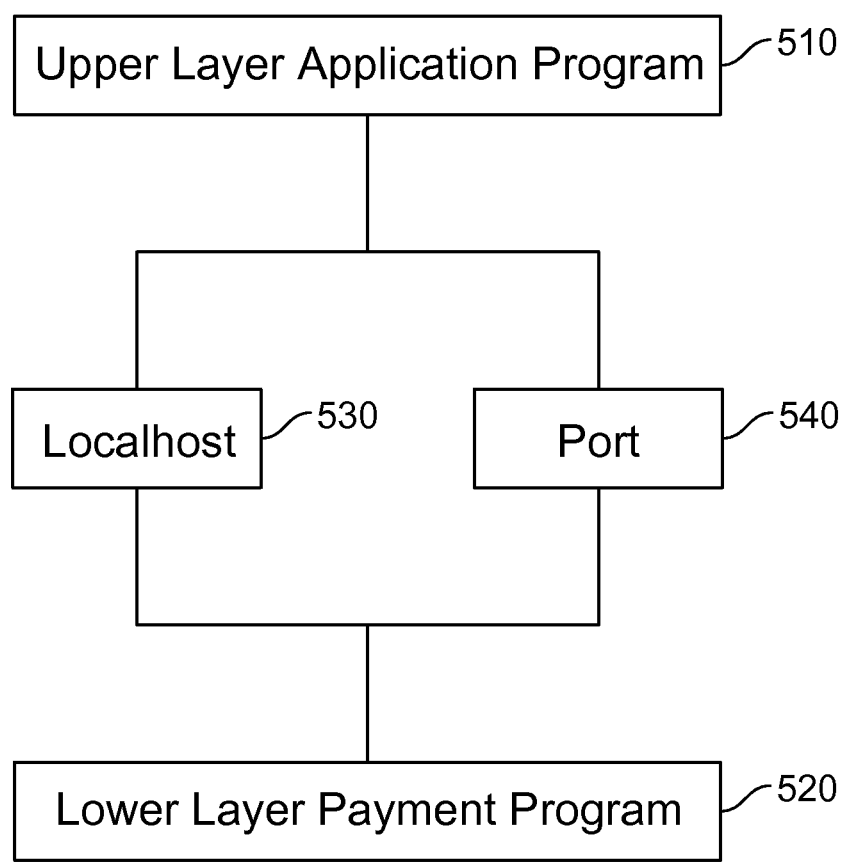
FIG. 5 is a block diagram illustrating components of an example mobile device system environment 500 that may be used in accordance with an embodiment of the present invention.

FIG. 5 is a block diagram illustrating components of an example mobile device system environment 500 that may be used in accordance with an embodiment of the present invention. As shown, system environment 500 includes an upper layer application code module 510 and a lower layer application program module 520. Both of the modules interact with the "localhost" 530 and a port 540 on the mobile device. Module 510 is configured to execute an upper layer payment application program to send a payment request to the "localhost" via a predetermined port, then wait and receive the feedback/payment result from a lower layer payment code and further conduct a plurality of processes based on the payment result. Module 520 is configured to monitor the request sent from the localhost over the network of the mobile device via the predetermined port and provides an input interface for payment information in response to the payment request of the upper layer application code and receive the input of the payment information, then return the processing result to the upper layer application code.

One skilled in the art should understand that the embodiments of this application may be provided as a method, a system, a computer, or a mobile device product. Therefore, this application may be in the form of full hardware embodiments, full software embodiments, or a combination thereof. Moreover, this application may be in the form of a computer program or mobile device application program product that is implemented on one or more computer or mobile device-usable storage media (including, without limitation, magnetic disk, CD-ROM, flash, and optical storages) containing computer or mobile device-usable program code. That program code includes instructions to make a computer apparatus or a mobile device execute full or partial embodiments of methods described above.

The respective embodiments of the present application are described one by one, the same and similar parts of the embodiments are made by reference and in each embodiment is emphasized the difference from other embodiments. Specifically, the system embodiments are described briefly due to similarity to the method embodiments and relevant modules of the system embodiments are made with reference to the method embodiments.

The present application may be applied to many universal or dedicated computing system environments or configurations, for example, a personal computer, a server computer, a mobile device, a top box, a handset or a portable device, a flat-panel device, a multi-processor system, a microprocessor-based system, a set-top box, a programmable consumer electric device, a network PC, a minicomputer, a large scale computer, a distributed computing system including any one of the above systems or devices, etc.

This application is described referring to the flow chart and/or block diagram of the method, system, and computer program product according to the embodiments of this application. It should be understood that each flow and/or block in the flow chart and/or block diagram and the combination of flows and/or blocks in the flow chart and/or block diagram may be realized in computer program instruction. In fact, the entire application may be described in a general context of a computer executable instruction that is executed by a computer, for example, a program module. Generally, the program module includes routines, programs, objects, components, data structures, etc. for executing a specified task or implementing a specified abstract data type.

Alternatively, the present invention may be implemented in a distributed computing environment, where a remote processing device connected through a communication network executes the task. In the distributed computing environment, the program module may be located in a local or remote computer storage medium which includes a storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing payment through a mobile device, comprising:
   receiving a command relating to processing a payment;
   generating, using an upper layer application program executing on the mobile device, a payment request based on the command, the upper layer application program relating to a script or a Hypertext Markup Language (HTML); and
   sending, using the upper layer application program, the payment request to a lower layer payment program for processing, the upper layer application program relating to system code or an application programming interface (API), wherein the sending of the payment request comprises:
      sending, using a transmission control protocol (TCP) or a user datagram protocol (UDP), the payment request to a localhost address of the mobile device via a predetermined port, the localhost address of the mobile device corresponding to a loopback Internet Protocol (IP) address; and
      blocking the upper layer application program until feedback from the lower layer payment program has been received;
   monitoring, using the lower layer payment program, the payment request sent from the localhost address of the mobile device via the predetermined port;
   in response to receiving the payment request:
      providing, using the lower layer payment program, an input interface for payment information in; and
      receiving the input payment information;
   connecting, using the lower layer payment program, with a payment and server;
   passing the payment information over a network to the payment server;
   transferring, using the lower layer payment program, a payment processing result received from the payment server to the upper layer application program; and
   after the upper layer application program has been unblocked, presenting to a user, using the upper layer application program, an indication of whether the payment has been successfully processed.

2. The method of claim 1, wherein:
   the payment request includes a password; and
   in response to the payment request, the method further comprises processing the password by calling an encryption application programming interface (API).

3. The method of claim 1, wherein the upper layer application program is a program that provides a user interface configured to interact with a user.

4. The method of claim 1, wherein the lower layer payment program is a program that interacts with the mobile device's hardware platform.

5. The method of claim 1, wherein the command is to open a purchase link of a website.

6. The method of claim 1, wherein the command is to send a payment to a game server.

7. The method of claim 1, wherein the payment request is a Hypertext Transport Protocol (HTTP) based request.

8. The method of claim 1, wherein the payment request sent by the upper layer application program includes a plurality of parameters.

9. The method of claim 8, wherein the lower layer payment program further performs a plurality of corresponding processes in response to the respective ones of the plurality of parameters in the payment request.

10. The method of claim 1, wherein the upper layer application program includes a web browser.

11. The method of claim 1, wherein the upper layer application program includes a game application program client.

12. A system for processing payment through a mobile device, comprising:
one or more processors coupled to an interface, configured to:
receive a command relating to processing a payment;
generating, using an upper layer application program executing on the mobile device, a payment request based on the command the upper layer application program relating to a script or a Hypertext Markup Language (HTML); and
send, using the upper layer application program, the payment request to a lower layer payment program for processing, the upper layer application program relating to system code or an application programming interface (API), wherein the sending of the payment request comprises:
send, using a transmission control protocol (TCP) or a user datagram protocol (UDP), the payment request to a localhost address of the mobile device via a predetermined port, the localhost address of the mobile device corresponding to a loopback Internet Protocol (IP) address; and
block the upper layer application program until feedback from the lower layer payment program has been received;
monitor, using the lower layer payment program, the payment request sent from the localhost address of the mobile device via the predetermined port;
in response to receiving the payment request:
provide, using the lower layer payment program, an input interface for payment information in; and
receive the input payment information;
connect, using the lower layer payment program, with a payment server;
pass the payment information over a network to the payment server;
transfer, using the lower layer payment program, a payment processing result received from the payment server to the upper layer application program; and
after the upper layer application program has been unblocked, present to a user, using the upper layer application program, an indication of whether the payment has been successfully processed; and
one or more memories coupled to the one or more processors, configured to provide the processors with instructions.

13. The system of claim 12, wherein the upper layer application program is a program that provides a user interface configured to interact with a user.

14. The system of claim 12, wherein the lower layer payment program is a program that interacts with the mobile device's hardware platform.

15. The system of claim 12, wherein the command is to open a purchase link of a website.

16. The system of claim 12, wherein the command is to send a payment to a game server.

17. The system of claim 12, wherein the payment request sent by the upper layer application program includes a plurality of parameters.

18. A computer program product for processing payment through a mobile device, the computer program product being embodied in a non-transitory computer readable storage medium and comprising computer instructions for:
receiving a command relating to processing a payment;
generating, using an upper layer application program executing on the mobile device, a payment request based on the command, the upper layer application program relating to a script or a Hypertext Markup Language (HTML); and
sending, using the upper layer application program, the payment request to a lower layer payment program for processing, the upper layer application program relating to system code or an application programming interface (API), wherein the sending of the payment request comprises:
sending, using a transmission control protocol (TCP) or a user datagram protocol (UDP), the payment request to a localhost address of the mobile device via a predetermined port, the localhost address of the mobile device corresponding to a loopback Internet Protocol (IP) address; and
blocking the upper layer application program until feedback from the lower layer payment program has been received;
monitoring, using the lower layer payment program, the payment request sent from the localhost address of the mobile device via the predetermined port;
in response to receiving the payment request:
providing, using the lower layer payment program, an input interface for payment information in; and
receiving the input payment information;
connecting, using the lower layer payment program, with a payment server;
passing the payment information over a network to the payment server;
transferring, using the lower layer payment program, a payment processing result received from the payment server to the upper layer application program; and
after the upper layer application program has been unblocked, presenting to a user, using the upper layer application program, an indication of whether the payment has been successfully processed.

* * * * *

UNITED STATES PATENT AND TRADEMARK OFFICE
CERTIFICATE OF CORRECTION

PATENT NO. : 9,928,499 B2
APPLICATION NO. : 14/336718
DATED : March 27, 2018
INVENTOR(S) : Gang Li It is certified that error appears in the above-identified patent and that said Letters Patent is hereby corrected as shown below:

In the Claims

In Column 9, Claim 12, Line 24, delete "command" and insert --command,--, therefor.

Signed and Sealed this
Fourteenth Day of August, 2018

Andrei Iancu
*Director of the United States Patent and Trademark Office*